US010201730B2

(12) United States Patent
Deutsch et al.

(10) Patent No.: US 10,201,730 B2
(45) Date of Patent: Feb. 12, 2019

(54) EXERCISE DEVICE AND METHOD OF EXERCISING USING SAID DEVICE

(71) Applicant: Fitness Engineers Pty Ltd., Bondi Beach, New South Wales (AU)

(72) Inventors: Robert Deutsch, Bondi Beach (AU); Adam Gilchrist, Queenscliff (AU)

(73) Assignee: FITNESS ENGINEERS PTY LTD, New South Wales (AU)

( * ) Notice: Subject to any disclaimer, the term of this patent is extended or adjusted under 35 U.S.C. 154(b) by 193 days.

(21) Appl. No.: 15/117,791

(22) PCT Filed: Feb. 11, 2015

(86) PCT No.: PCT/AU2015/000074
§ 371 (c)(1),
(2) Date: Aug. 10, 2016

(87) PCT Pub. No.: WO2015/120504
PCT Pub. Date: Aug. 20, 2015

(65) Prior Publication Data
US 2017/0007884 A1 Jan. 12, 2017

(30) Foreign Application Priority Data

Feb. 11, 2014 (AU) ................................ 2014900408

(51) Int. Cl.
*A63B 24/00* (2006.01)
*A63B 71/00* (2006.01)
*A63B 71/06* (2006.01)
*A63B 47/00* (2006.01)
*G09B 5/04* (2006.01)
(Continued)

(52) U.S. Cl.
CPC .......... *A63B 24/0075* (2013.01); *A63B 47/00* (2013.01); *A63B 71/0036* (2013.01); *A63B 71/0622* (2013.01); *G09B 5/04* (2013.01); *A63B 5/20* (2013.01); *A63B 21/0726* (2013.01); *A63B 65/06* (2013.01); *A63B 71/06* (2013.01); *A63B 2024/0081* (2013.01); *A63B 2071/025* (2013.01); *A63B 2071/068* (2013.01); *A63B 2071/0625* (2013.01); *A63B 2220/806* (2013.01); *A63B 2220/808* (2013.01); *A63B 2225/09* (2013.01); *A63B 2225/15* (2013.01); *A63B 2225/20* (2013.01); *A63B 2225/50* (2013.01); *A63B 2225/682* (2013.01);
(Continued)

(58) Field of Classification Search
CPC ..................................................... A63B 24/00
See application file for complete search history.

(56) References Cited

U.S. PATENT DOCUMENTS 8,029,410 B2 10/2011 Shea
8,109,862 B2 2/2012 Cooper
(Continued)

*Primary Examiner* — Omkar Deodhar
(74) *Attorney, Agent, or Firm* — Nexsen Pruet, PLLC; E. Eric Mills

(57) ABSTRACT

An exercise device (1) having a base (2); a wall (3) extendable away from said base to a closure (4). The base, wall and closure defining a space (7) therebetween adapted to receive exercise equipment (10). A plurality of mounting means (12) locatable about said wall. A plurality of display means (14) each operatively associated with a respective one of said mounting means. The display means adapted in use to display an exercise to be performed by a user, so that in use said users positioned adjacent said device are provided information as to exercises to be performed at a particular location.

27 Claims, 25 Drawing Sheets

(51) Int. Cl.
    *A63B 71/02*     (2006.01)
    *A63B 65/06*     (2006.01)
    *A63B 5/20*     (2006.01)
    *A63B 21/072*     (2006.01)
    *H04M 1/725*     (2006.01)

(52) U.S. Cl.
    CPC ... *A63B 2225/685* (2013.01); *A63B 2225/687* (2013.01); *H04M 1/7253* (2013.01)

(56) References Cited

U.S. PATENT DOCUMENTS

| | | |
|---|---|---|
| 8,241,118 B2 | 8/2012 | Camhi |
| 2008/0179214 A1 | 7/2008 | Hall |

EXERCISE DEVICE AND METHOD OF EXERCISING USING SAID DEVICE

CROSS REFERENCE TO RELATED APPLICATIONS

This application is a 35 U.S.C. § 371 U.S. national phase entry of International Application No. PCT/AU2015/000074 having an international filing date of Feb. 11, 2015, which claims the benefit of Australian Application No. 2014900408 filed Feb. 11, 2014, each of which is incorporated herein by reference in its entirety.

FIELD

There is also a need for a workout of the day and this workout is accessible from our server so that everyone around the world and in every park does the same workout. This workout could be presented by celebrities to assist with motivating an exercise participant.

The present invention relates to an exercise device and in particular to methods of exercising using such device including association with a mobile electronic device such as a mobile phone running a software application that communicates with a server over a communications network.

BACKGROUND

People exercise for various reasons, such as, enjoyment of exercising, to maintain a fitness or strength level or to lose weight In many cases, people exercise at a fitness centre or go for a swim or a run. In all these cases, people tend to be exercising on their own and with little structure or guidance. It has been found that when exercising on your own or without structure a person is less likely to be motivated to exercise correctly, regularly or at a sufficient level to achieve goals, such as, increased fitness, strength or loss of weight. There is therefore a need to encourage people to exercise together in a structured environment to provide motivation for people to regularly exercise. One such problem is that there may not be a sufficient number of fitness centres, exercise equipment, parking or like-minded people in a location that is desirable to you. Accordingly, there is also a need to provide a mobile exercise device that can be located anywhere at any time. Such a device however would also need to include means to direct exercising participants to that location and how to exercise in a structured manner to achieve goals. There is also a need to provide a device that permits exercising participants of various fitness levels to exercise together at the same time using the same device.

Object of the Invention

It is an object of the present invention to substantially overcome or at least ameliorate one or more of the disadvantages of the prior art, or to at least provide a useful alternative.

SUMMARY OF INVENTION

Disclosed are arrangements, referred to as Congregational Exercising (CE) arrangements, which seek to address the above problems by providing (a) a mobile exercise device (referred to hereinafter as the "exercise device") enabling structured exercise routines to be performed by a number of participants including the owner of the exercise device and a number of other people (referred to as "remote participants") who congregate to participate in the exercise sessions, and (b) a software application (referred to hereinafter as the "application") running on an electronic device such as a PC or mobile phone (referred to hereinafter as the "communication device") that communicates with a remote CE server running CE server software over a communications network, for (i) enabling the owner of the exercise device to electronically publish details for a proposed exercise session, (ii) for enabling remote participants, using the application running on their communication devices to apply for participation in the exercise session, and (iii) for providing audio information to the participants during the exercise session.

There is disclosed herein an exercise device having:
a base;
a wall extendable away from said base to a closure;
said base, wall and closure defining a space therebetween adapted to receive exercise equipment;
a plurality of mounting means locatable about said wall;
a plurality of display means each operatively associated with a respective one of said mounting means, said display means adapted in use to display an exercise to be performed by a user, so that in use said users positioned adjacent said device are provided information as to exercises to be performed at a particular location.

Preferably, said device further includes a plurality of locators each operatively associated with a respective one of said display means, said locators adapted to define the particular location defining an exercise station.

Preferably, said locator is adapted to be positioned at a distance from said display means.

Preferably, said locator is adapted to be positioned on said device

Preferably, each said locator includes a rigid member and a flexible elongate portion extendable between said rigid member and said base.

Preferably, each said rigid member is adapted to be received within a corresponding slot within said base.

Preferably, said locator includes an elongate portion having a first end and a second end.

Preferably, said each said rigid member is adapted to be received by said device.

Preferably, said locator includes a flexible member.

Preferably, said locator includes a close rigid member.

Preferably, said device includes a plurality of locators adapted to form an exercise grid in use.

Preferably, said device includes means to retract said flexible portion into said base.

Preferably, said device includes means to fix said rigid member in a particular location away from said base.

Preferably, each said mounting means includes a slot in said wall.

Preferably, each said display means provides an exercise.

Preferably, each said display means includes a card.

Preferably, each said card is to be located within said slot in use.

Preferably, each said card includes a unique identifier.

Preferably, said identifier is a number, letter or combination thereof.

Preferably, said base includes at least one wheel to assist with the mobility of said device.

Preferably, said device includes an insert securable to said base and adapted to hold exercise equipment.

Preferably, said wall and closure are a single member, said single member adapted to be lifted away from said base to access said space.

Preferably, said wall includes at least one panel, said panel adapted to be moved to allow access to said space.

Preferably, said closure is a lid.

Preferably, said device includes means to provide an audio signal.

Preferably, said device includes a slot to receive a speaker in use.

Preferably, said device includes a speaker.

Preferably, said device includes power means.

Preferably, said device includes means to provide audio directions to said users.

Preferably, said device includes means to connect an electronic device to said exercise device.

An exercise system comprising:

an exercise device as described hereinabove an owner communication device configured to communicate owner session information about a proposed exercise session to a server over a communication network, the exercise session comprising a plurality of exercise routines;

said server being configured (a) to accumulate remote participant requests to join said session, (b) to determine participant session information by allocating authorized remote participants to said exercise routines, and (c) to communicate the participant session information to the owner communication device; wherein the owner communication device is further configured to direct the authorized remote participants to specified exercise stations during the exercise session using audio directions dependent upon the participant session information.

Preferably, the owner session information comprises a location of the proposed exercise session, and information describing a type and a degree of difficulty of the exercise routines.

Preferably, the server authorizes remote participant requests dependent upon a number of exercise stations of the exercise device.

Preferably, the server determines the participant session information dependent upon at least one of the number of exercise stations of the exercise device, and the number of different exercise types assigned to the exercise sessions.

A method of conducting an exercise session, the method comprising the steps of:

communicating, by an owner communication device, owner session information about a proposed exercise session to a server over a communication network, the exercise session comprising a plurality of exercise routines;

accumulating, by the server, remote participant requests to join said session;

determining, by the server, participant session information by allocating authorized remote participants to said exercise routines;

communicating, by the server, the participant session information to the owner communication device; and directing, by the owner communication device, the authorized remote participants to specified exercise stations during the exercise session using audio directions dependent upon the participant session information.

A computer readable non-transitory storage medium storing a computer executable program for directing at least one processor to perform a method for conducting an exercise session, the method comprising the steps of:

communicating, by an owner communication device, owner session information about a proposed exercise session to a server over a communication network, the exercise session comprising a plurality of exercise routines;

accumulating, by the server, remote participant requests to join said session; determining, by the server, participant session information by allocating authorized remote participants to said exercise routines;

communicating, by the server, the participant session information to the owner communication device; and directing, by the owner communication device, the authorized remote participants to specified exercise stations during the exercise session using audio directions dependent upon the participant session information.

BRIEF DESCRIPTION OF DRAWINGS

FIGS. 28, 29, 30, 31 and 32 show the embodiment of FIG. 18 with the equipment closed in;

DESCRIPTION OF EMBODIMENTS

Figure 1:
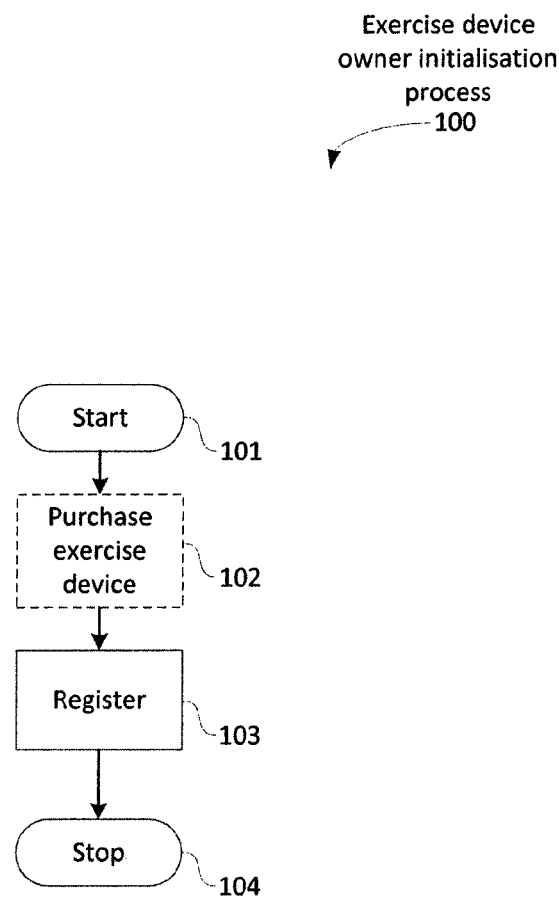
FIG. 1 is a flow chart of an example of a process depicting how a person purchases and registers an exercise device, thereby becoming the owner of the exercise device.

Where reference is made in any one or more of the accompanying drawings to steps and/or features, which have the same reference numerals, those steps and/or features have for the purposes of this description the same function(s) or operation(s), unless the contrary intention appears.

Figure 12A:
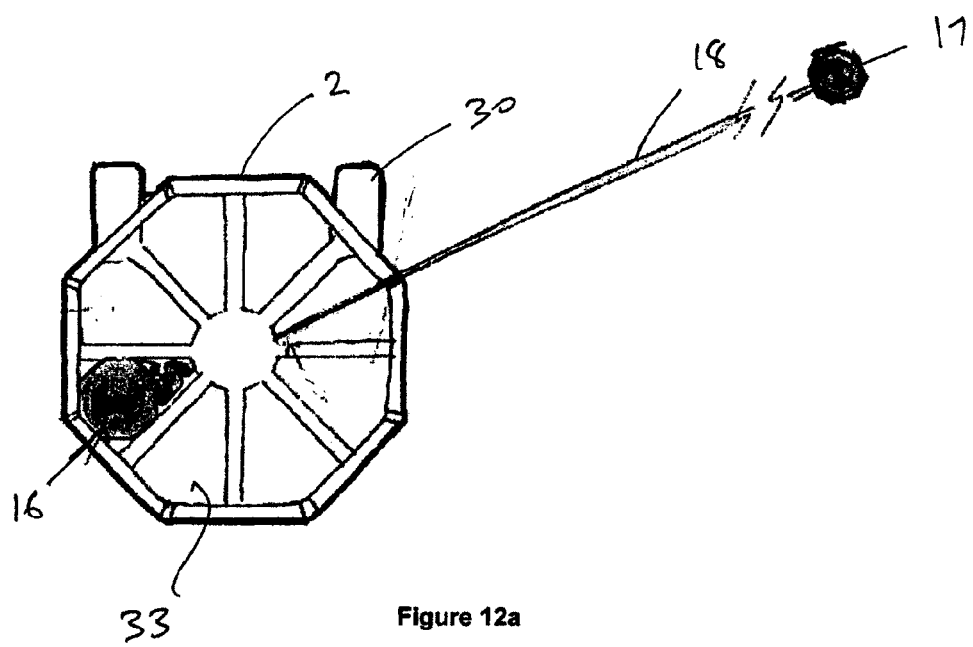
FIGS. 12a, 12b and 12c show the locator of an embodiment of the present invention.
Figure 12B:
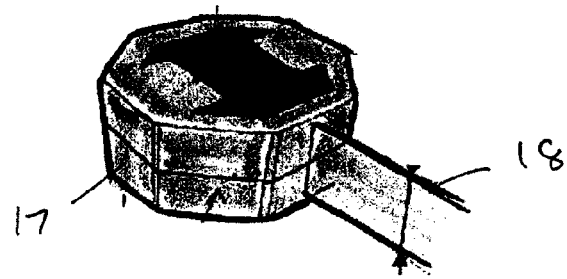
Figure 12C:
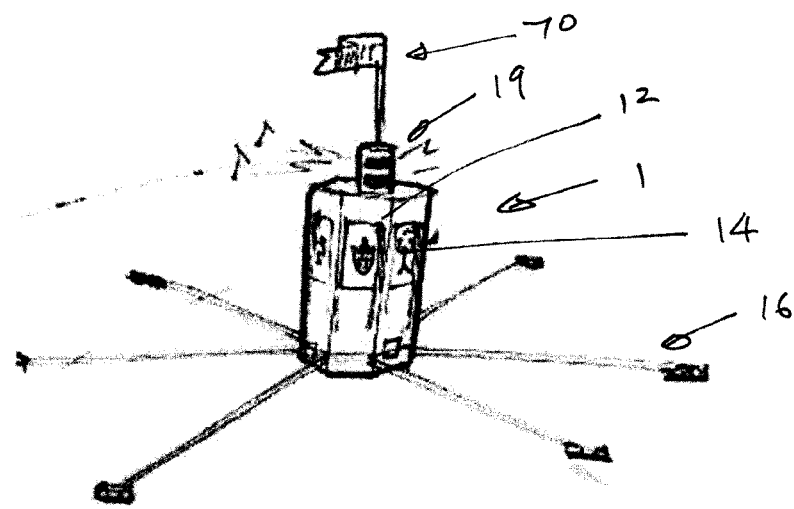
Figure 13:
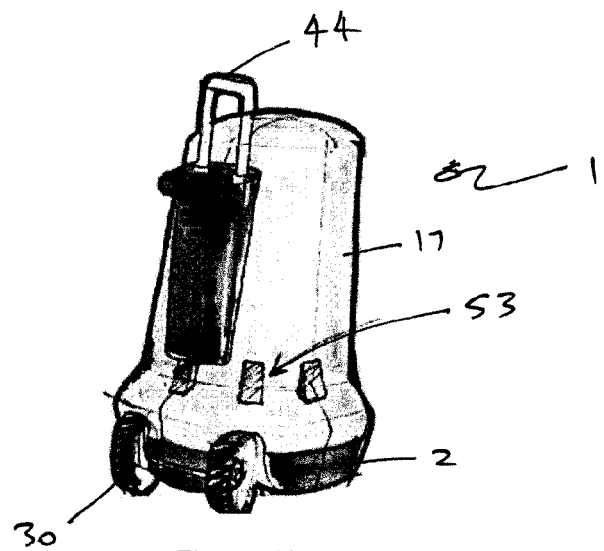
FIG. 13 shows an alternate embodiment of the present invention.

There is disclosed herein an exercise device 1 having a base 2, a wall 3 extendable away from the base 2 to a closure 4. The base 2, wall 3 and closure 4 defining a space 7 therebetween adapted to receive exercise equipment 10. The exercise equipment 10 can be any type of exercise equipment, such as, dumbbells, medicine balls, skipping ropes, weights, obstacles, power bands, agility ladders, straps, nets, spikes, grids, or the like. The device 1 further includes a plurality of mounting means 12 locatable about the wall 3. A plurality of display means 14 as best seen in FIG. 12, are each operatively associated with a respective one of the mounting means 12. The display means 14 are adapted in use to display exercises to be performed by a user so that in use the users spaced about the device 1 are provided information as to exercises to be performed at their particular location or station.

Figure 11A:
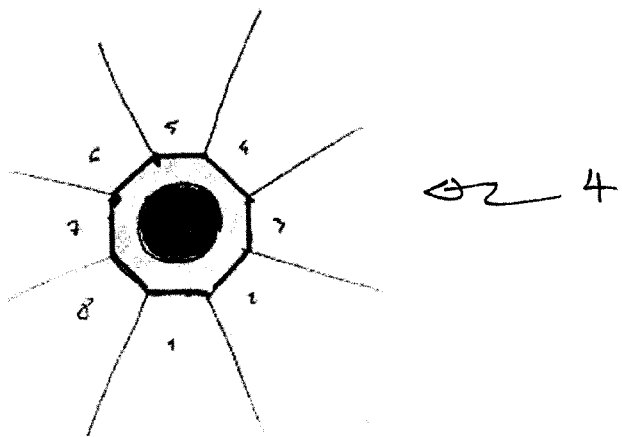
FIGS. 11a to 11c show the closure of FIGS. 10a and 10b separated from the base and wall.
Figure 11B:
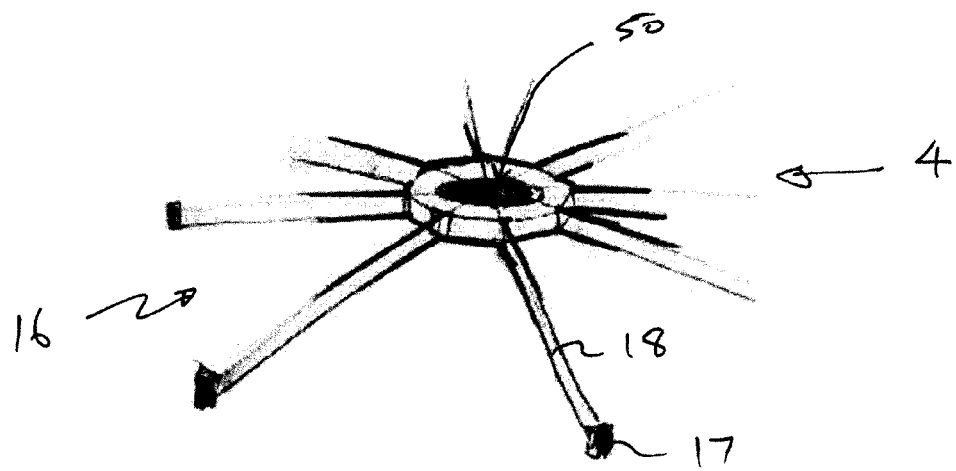

In a preferred form, the device 1 further includes a plurality of locators 16 each operatively associated with a respective one of the display means 14. The locators 16 are adapted to be moved away from the device 1 and positioned at a distance from the display means 14 so as to define an exercise station as best seen in FIGS. 11a and 12a. In other embodiments, the locators 16 could be located on the device 1. In another embodiment, the locators 16 could be adapted to form an exercise grid or the like. In an alternate, the display means could act as locators.

Figure 11C:
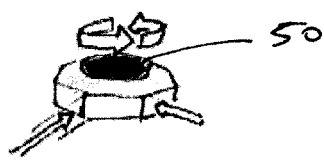
Figure 14A:
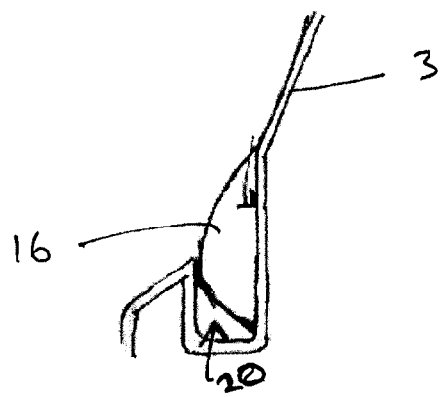
FIGS. 14a and 14b show the locator of an embodiment of the present invention.

In a preferred form, each locator 16 includes a rigid member 17 and a flexible elongate portion 18 extendible between the rigid member 17 and the base 2. The flexible elongate portion 18 typically would be a ribbon, cord, rope or the like. Each of the rigid members 17 is adapted to be received within a corresponding slot 20 within the base 2 and as best seen in FIG. 14a. However, the rigid members 17 could also be located in the space 7 as shown in FIG. 12a. In a preferred embodiment, the device 1 includes means to retract the locator 16 from its spaced location for example as shown in FIG. 11c. In a preferred embodiment the rigid member 17 includes means to fix the rigid member 17 in a particular location away from the base 2. For example, it could include a weight, peg, protrusion, spike or the like. In alternate embodiments, the locators 16 could be all flexible, all rigid or combinations thereof.

As best seen in FIG. 12a, the wall 3 includes slots 12. The slots 12 form the mounting means and are locatable about the wall 3 and evenly spaced about the device 1. Locatable within each of the slots 12 is a respective display means 14 which is adapted to provide exercises to a user positioned opposite the display means 14. The display means 14 may include more than one exercise. The display means 14 could be in the form of a card or an electronic display such as an LCD screen or the like. In a preferred form, each card 14 includes a unique identifier such as a number, letter or combination thereof which corresponds to a particular predetermined exercise. The cards 14 can be located within the space 7 when not in use.

The base 2 can include wheels 30 to assist with the mobility of the device 1 to a particular location where exercise is to be conducted. The base 2 can include feet 31 to raise the base 2 above a ground surface and also include compartments 33 to receive exercise equipment 10, water bottles (not shown), locators 16 or any other such items.

Figure 8A:
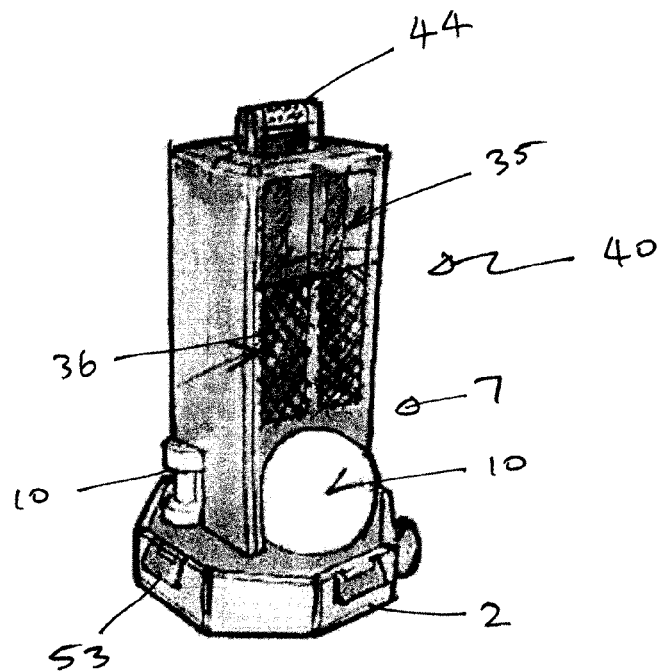
FIGS. 8a and 8b show the device of FIG. 7 separated into base and insert and wall and closure of the present invention.
Figure 9A:
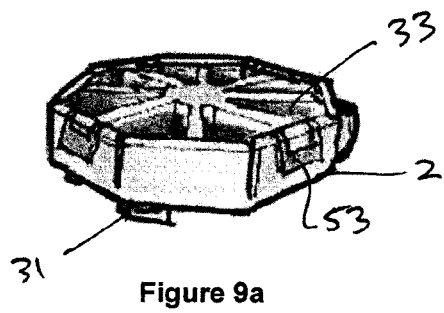
FIGS. 9a and 9b show FIG. 8a separated into base and insert of the present invention.
Figure 9B:
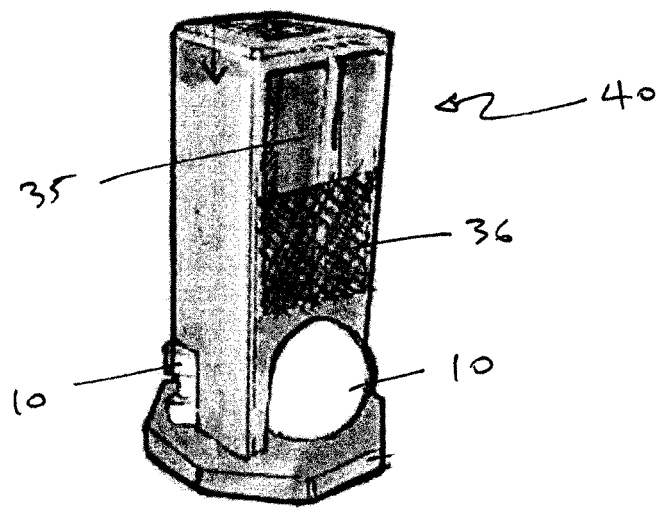

As best seen in FIGS. 8a and 9b the device 1 could further include an insert part 40 securable to the base 2 and adapted to hold the exercise devices 10, cards 14 or the like. As shown in the drawings, the insert could include a number of compartments 35 and netting 36. The insert 40 could also include a handle 44.

Figure 7:
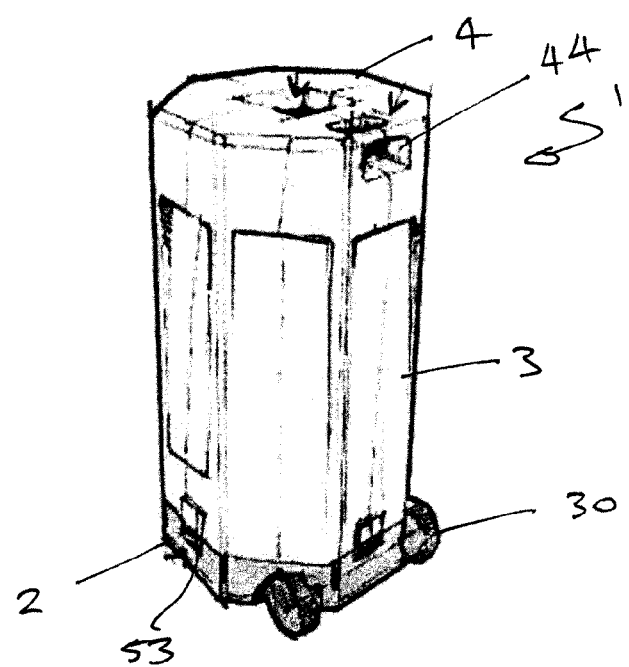
FIG. 7 shows an embodiment of a device of the present invention.
Figure 8B:
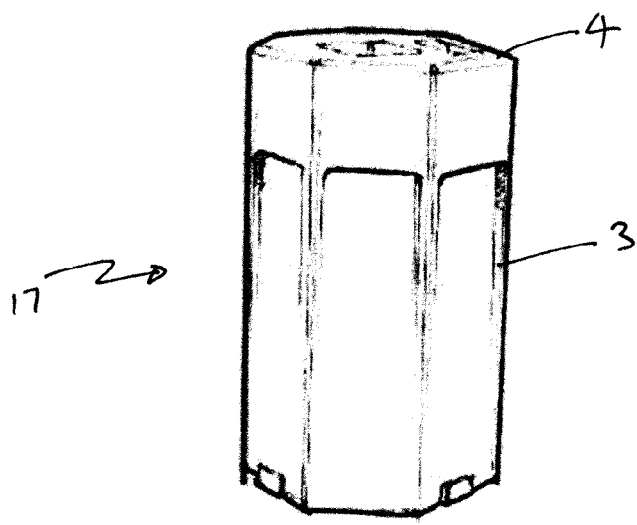

In a preferred form, the wall 3 and closure 4 are a single member 17 as best seen in FIGS. 7 and 8b. The single member 17 being adapted to be lifted away from the base 2 over the insert 40 to allow access to the space 7. However, it should be appreciated that the single member 17 could also be separate parts such as shown in FIG. 10b where the closure 4 separates from the device 1.

Figure 10A:
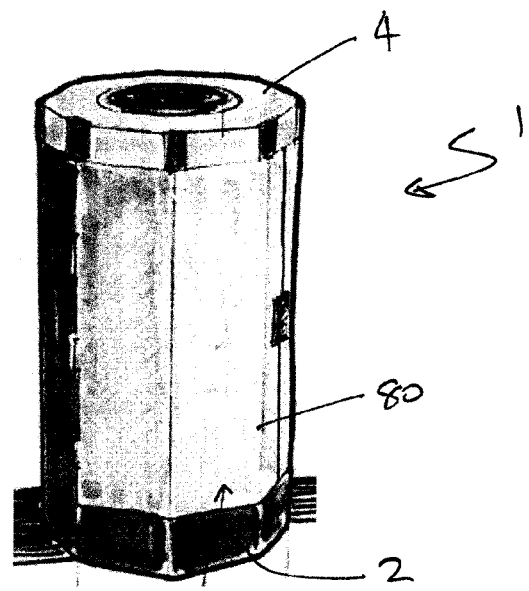
FIGS. 10a and 10b show an alternate embodiment of the present invention.
Figure 10B:
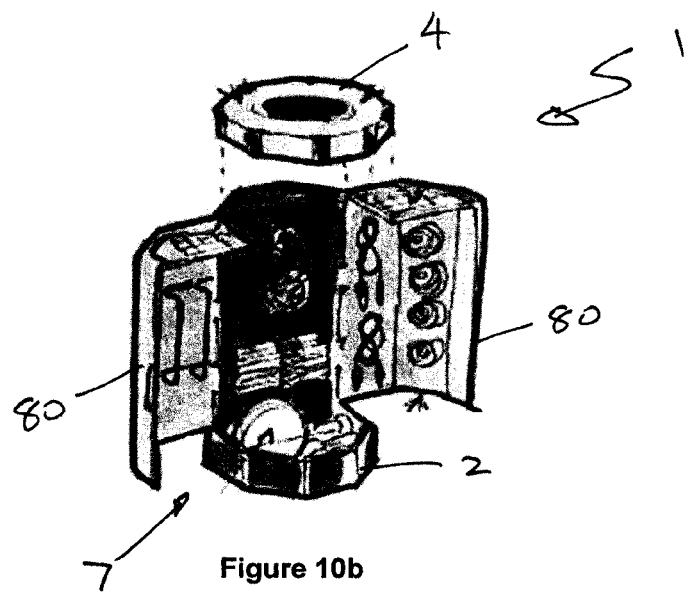

In the embodiment shown in FIG. 10b, the closure 7 can include the locators 16. In this embodiment a winding mechanism or the like 50 retracts the locators 16 back to the closure 7. In this particular embodiment, the wall 3 also includes at least one panel 80 adapted to be moved to allow access to the space 7. For example, in FIG. 10b, there are two doors 80, one on the left and one on the right, which are movable apart to provide access to the space 7. The base 2 can further include clips 53 or the like to secure the wall 3 to the base 2 (i.e. the insert 40 to the single member 17) and the doors could also hold equipment, speakers 19 or the like.

In a further embodiment, the device 1 can include power means in the form of solar panels 60, batteries (not shown) or electrical mains power access (not shown). The device 1 however does not necessarily need power. The device 1 could further include a flag 70 or the like and means 75 to provide attachment for an audio device for the users of the device. The audio means 75 can include speakers or the like or access to electronic mobile devices, such as, mobile phones or iPods. The device 1 may include further pockets, apertures or the like to retain keys, watches, wallets or the like or accommodate housing of water bottles. The device 1 could include in-built speakers or clocks (not shown).

In an alternate embodiment, the wheels 30 and axle of the device 1 are adjustably configurable to form bar bells or the like usable by the exercise user. The display means and locators could provide a board game style for children and one or more persons could exercise at each station.

Figure 14B:
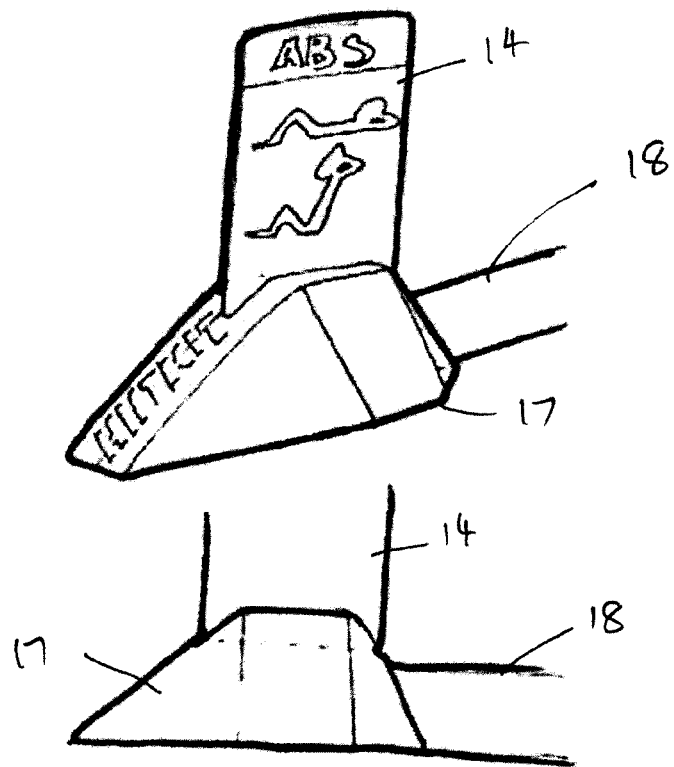
Figure 15:
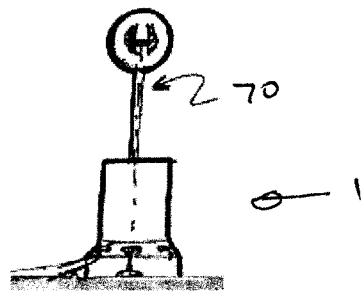
FIG. 15 shows an alternate embodiment of the present invention.
Figure 16:
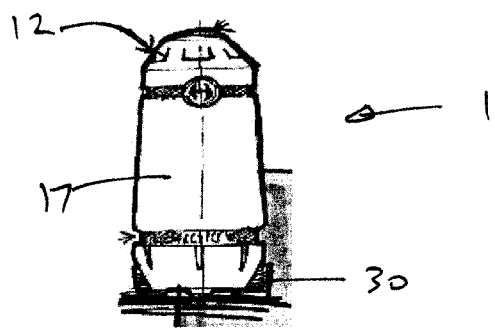
FIG. 16 is an alternate embodiment of the present invention.
Figure 17:
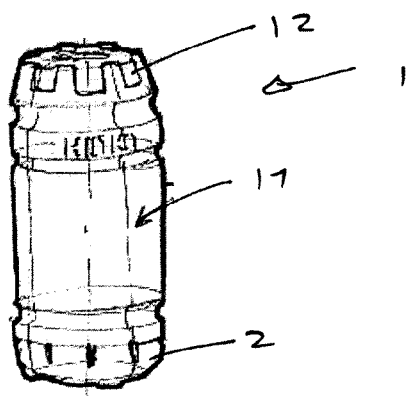
FIG. 17 is an alternate embodiment of the present invention.
Figure 18:
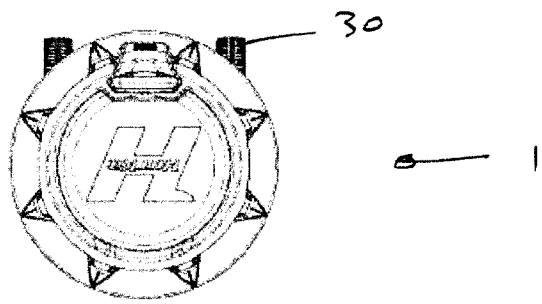
FIGS. 18, 19, 20, 21 and 22 show an alternate embodiment of the invention with the unit closed.
Figure 19:
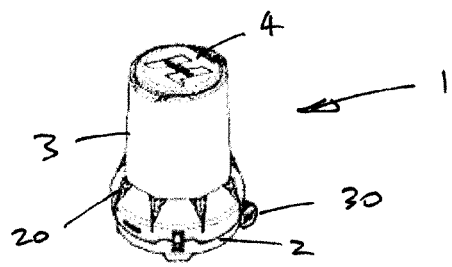
Figure 20:
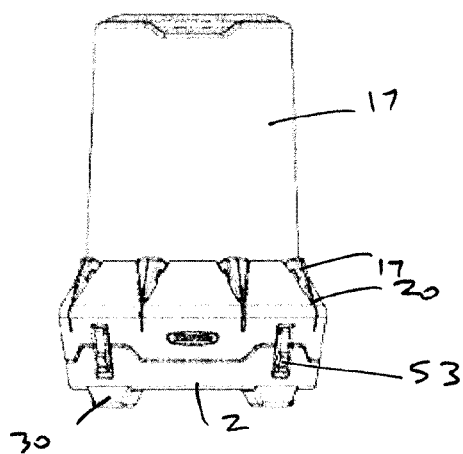
Figure 21:
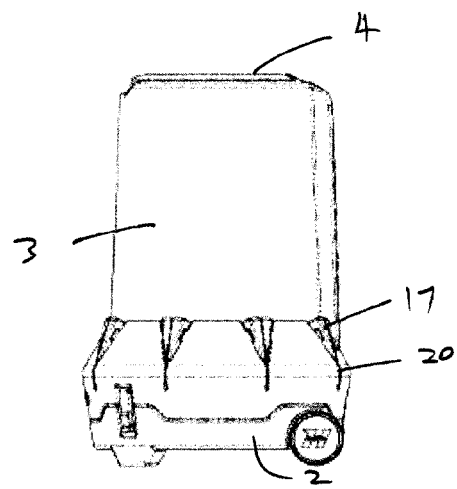
Figure 22:
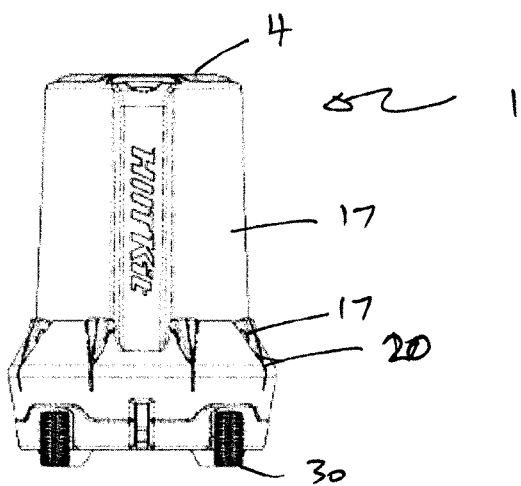
Figure 23:
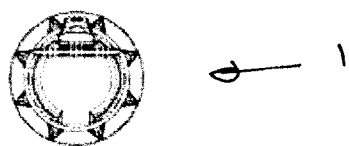
FIGS. 23, 24, 25, 26 and 27 show the embodiment of FIG. 18 with the unit sign up.
Figure 24:
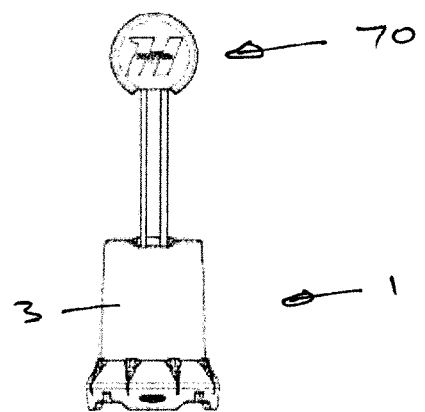
Figure 25:
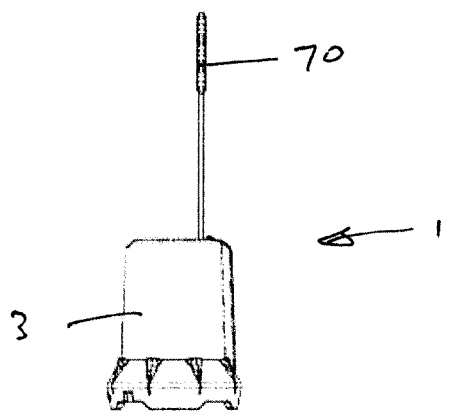
Figure 26:
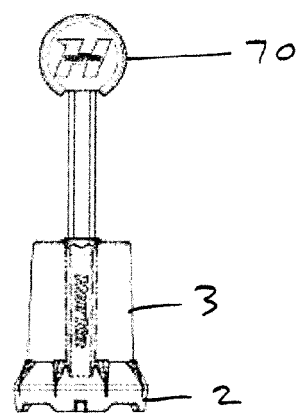
Figure 27:
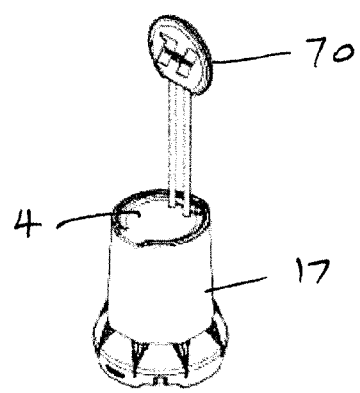
Figure 28:
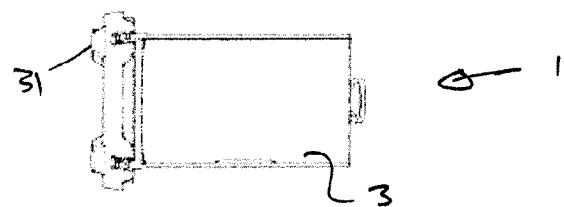
Figure 29:
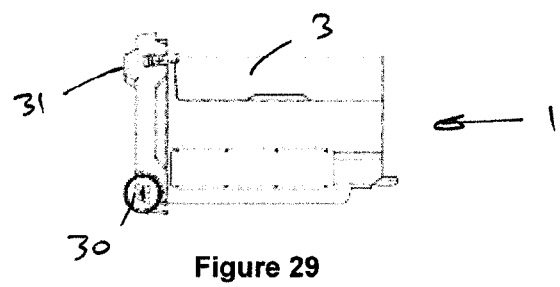
Figure 30:
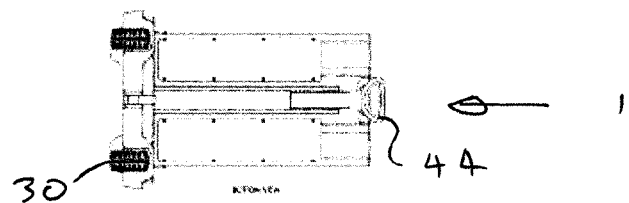
Figure 31:
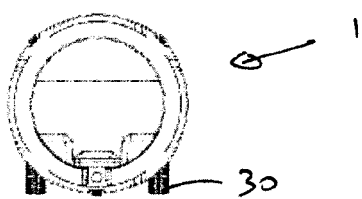
Figure 32:
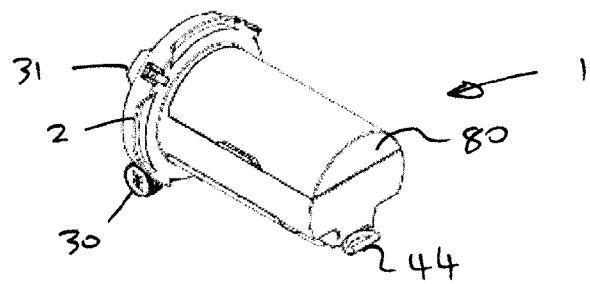
Figure 33:
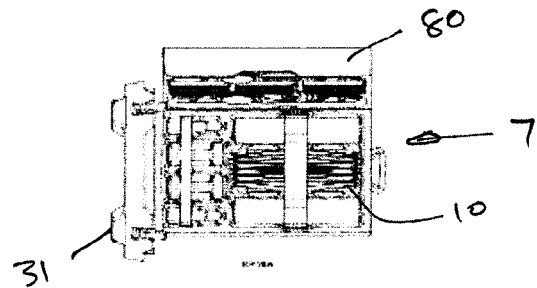
FIGS. 33, 34, 35 and 36 show the embodiment of FIG. 18 with the equipment open.
Figure 34:
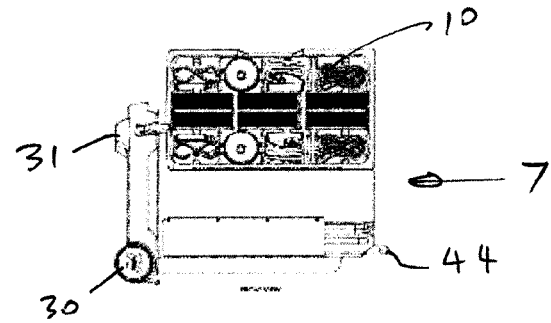
Figure 35:
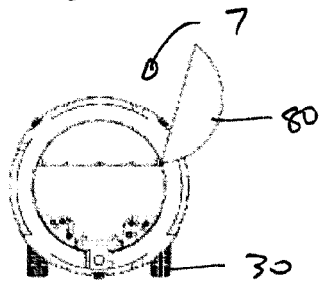
Figure 36:
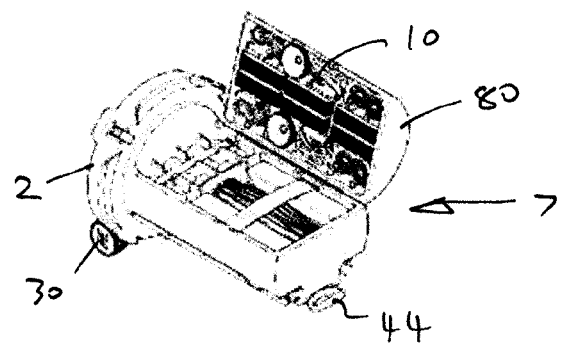
Figure 37:
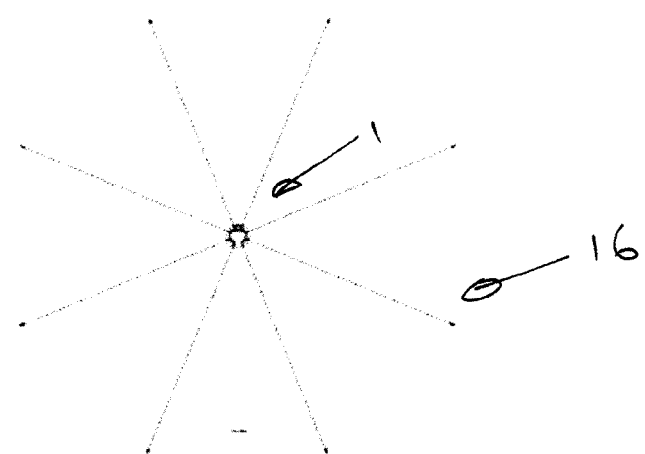
FIGS. 37 and 38 show the embodiment of FIG. 18 with the locators in a grid.
Figure 38:
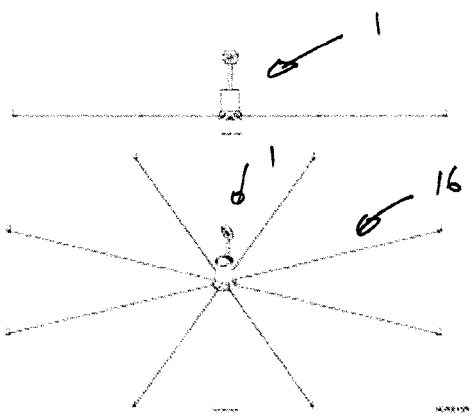

In another embodiment, and as shown in FIG. 14b a further display means 80 can be provided at the locator 16. It should be appreciated that any number of locators 16 an exercise stations could be utilised. The stations could be positioned in a variety of patterns adjacent the device 1.

Figure 39A:
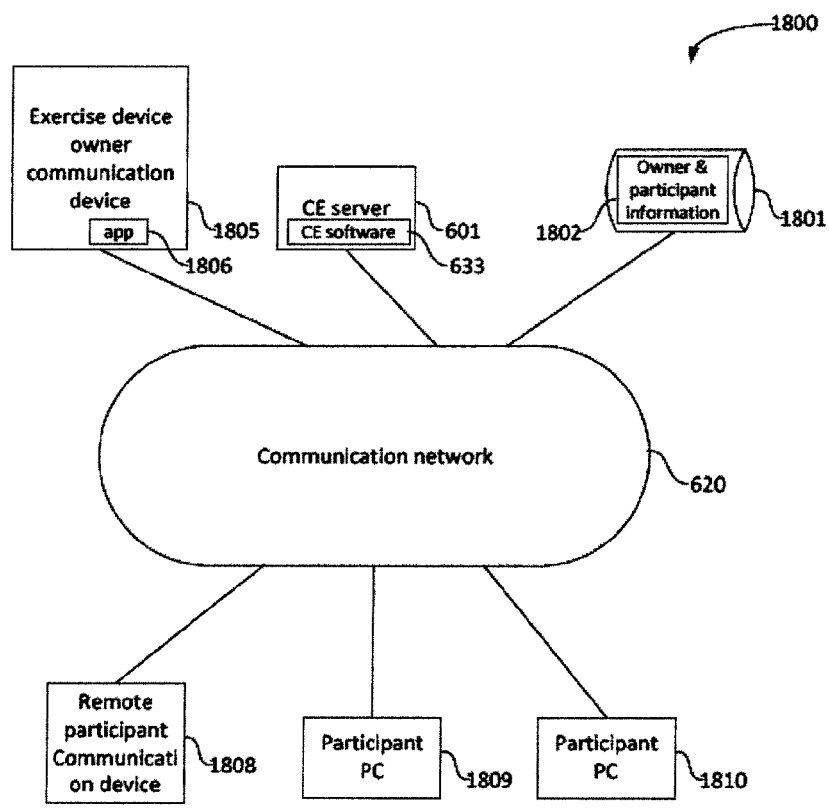
FIGS. 39A and 39B depict an example of a functional block diagram of the CE arrangement.
Figure 39B:
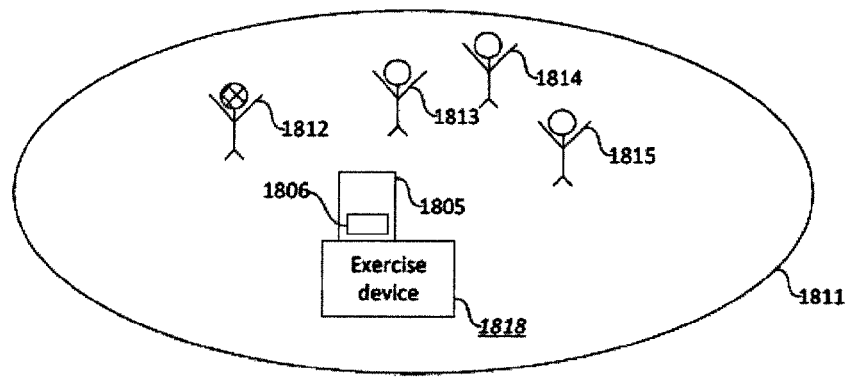

FIGS. 39A and 39B depict an example 1800 of a functional block diagram of a CE arrangement 1800. The owner of an exercise device 1818 communicates, using his communication device 1805 running a CE application 1806, with a CE server 601 running CE server software 633 over a communication network 620. The CE server 601 communicates with a database 1801 which stores owner session information and participant session information 1802. A number of remote participants having associated communication devices 1808-1810 each running the CE application (not shown) can communication with the CE server 601 over the communication network 620 in order to request participation in an exercise session. The mobile devices such as 1805 and 1808 execute the CE application in conjunction with the CE server executing the CE server software 633 in order to provide the disclosed CE functionality.

FIG. 39B depicts the owner 1812 of the exercise device 1818 and a number of remote participants 1813, 1814, 1815 who have been authorised to congregate and attend the exercise session in question. The owner's communication device 1805 has been connected to the exercise device 1818 by, for example, inserting the communication device into the requisite slot in the exercise device 1818. The CE application 1806 executes on the communication device 1805 and communicates with electronic circuitry and audio speakers (not shown) in the exercise device 1818 in order to direct the various participants 1812, 1813, 1814, and 1815 to the various exercise stations as the exercise session progresses.

Figure 6A:
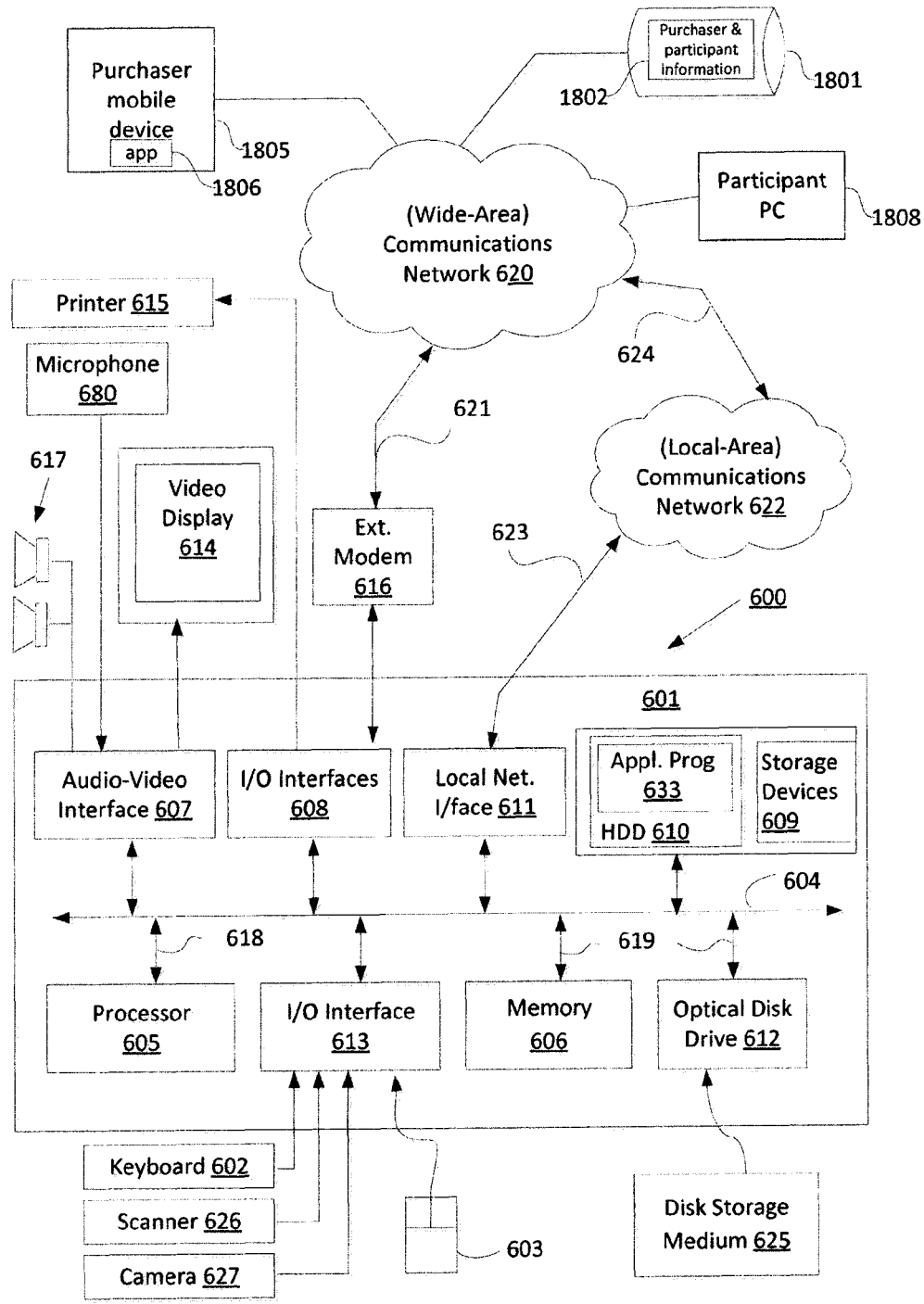
FIGS. 6A and 6B form a schematic block diagram of a general purpose computer system upon which CE arrangements described can be practiced.
Figure 6B:
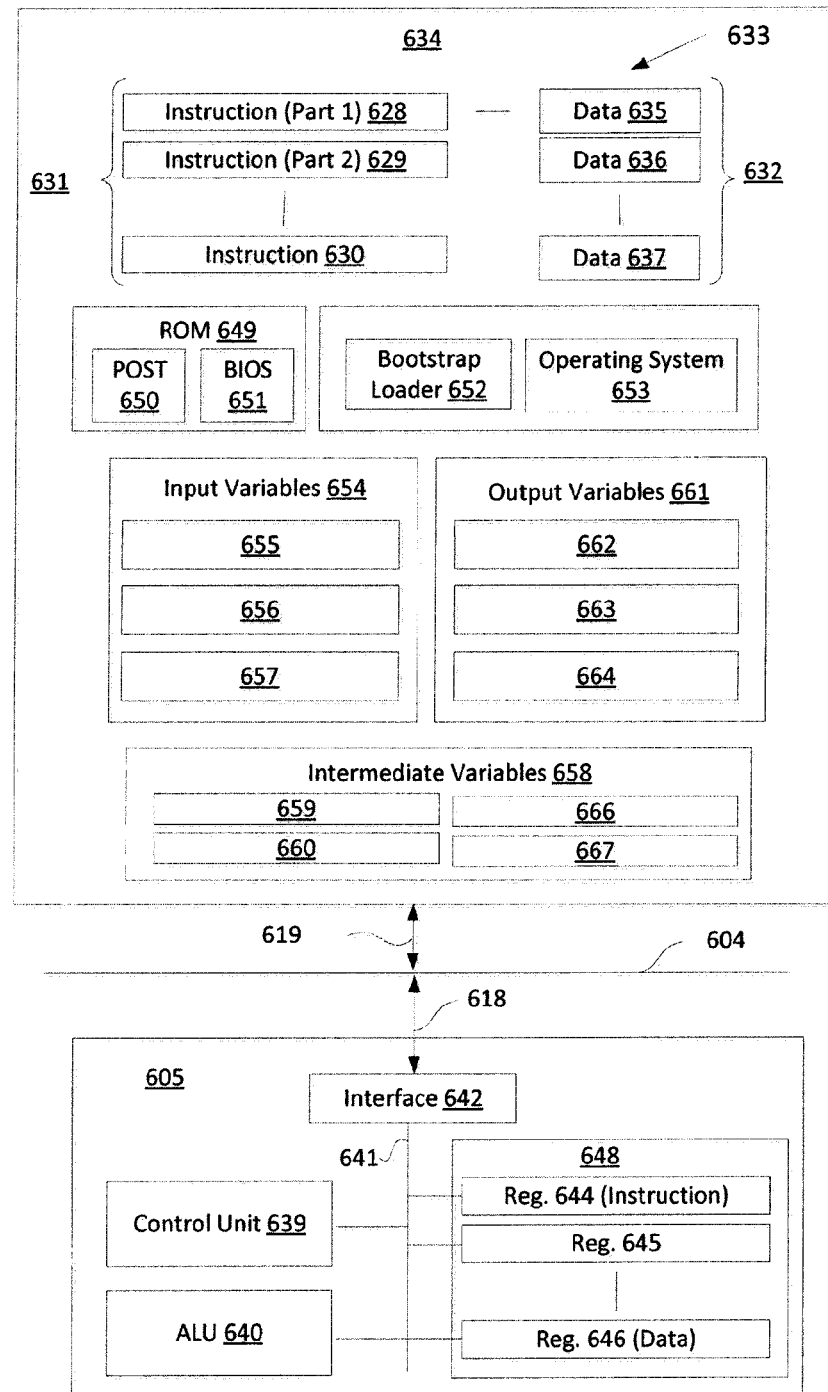

FIGS. 6A and 6B form a schematic block diagram of a general purpose computer system 600 upon which CE arrangements described can be practiced.

As seen in FIG. 6A, the computer system 600 includes: a computer module 601 which functions as the CE server; input devices such as a keyboard 602, a mouse pointer device 603, a scanner 626, a camera 627, and a microphone 680; and output devices including a printer 615, a display device 614 and loudspeakers 617. An external Modulator-Demodulator (Modem) transceiver device 616 may be used by the computer module 601 for communicating to and from the owner communication device 1805, the server database 1801, and the remote participant communication device 1808 over the communications network 620 via a connection 621. The communications network 620 may be a wide-area network (WAN), such as the Internet, a cellular telecommunications network, or a private WAN. Where the connection 621 is a telephone line, the modem 616 may be a traditional "dial-up" modem. Alternatively, where the connection 621 is a high capacity (e.g., cable) connection, the modem 616 may be a broadband modem. A wireless modem may also be used for wireless connection to the communications network 620.

The CE server computer module 601 typically includes at least one processor unit 605, and a memory unit 606. For example, the memory unit 606 may have semiconductor random access memory (RAM) and semiconductor read only memory (ROM). The computer module 601 also includes an number of input/output (I/O) interfaces including: an audio-video interface 607 that couples to the video display 614, loudspeakers 617 and microphone 680; an I/O interface 613 that couples to the keyboard 602, mouse 603, scanner 626, camera 627 and optionally a joystick or other human interface device (not illustrated); and an interface 608 for the external modem 616 and printer 615. In some implementations, the modem 616 may be incorporated within the computer module 601, for example within the interface 608. The computer module 601 also has a local network interface 611, which permits coupling of the computer system 600 via a connection 623 to a local-area communications network 622, known as a Local Area Network (LAN). As illustrated in FIG. 6A, the local communications network 622 may also couple to the wide network 620 via a connection 624, which would typically include a so-called "firewall" device or device of similar functionality. The local network interface 611 may comprise an Ethernet circuit card, a Bluetooth™ wireless arrangement or an IEEE 802.11 wireless arrangement; however, numerous other types of interfaces may be practiced for the interface 611.

The I/O interfaces 608 and 613 may afford either or both of serial and parallel connectivity, the former typically being implemented according to the Universal Serial Bus (USB) standards and having corresponding USB connectors (not illustrated). Storage devices 609 are provided and typically include a hard disk drive (HDD) 610. Other storage devices such as a floppy disk drive and a magnetic tape drive (not illustrated) may also be used. An optical disk drive 612 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 600.

The components 605 to 613 of the computer module 601 typically communicate via an interconnected bus 604 and in a manner that results in a conventional mode of operation of the computer system 600 known to those in the relevant art. For example, the processor 605 is coupled to the system bus 604 using a connection 618. Likewise, the memory 606 and optical disk drive 612 are coupled to the system bus 604 by connections 619. Examples of computers on which the described arrangements can be practiced include IBM-PC's and compatibles, Sun Sparcstations, Apple Mac™ or a like computer systems.

The CE methods may be implemented using the computer system 600 wherein the processes of FIGS. 1-5, to be described, may be implemented as one or more software application programs 1806, 633 executable within the computer system 600. The software application(s) used to implement the CE arrangements comprise two modules, namely (a) the CE application which executes on the communication devices used by the exercise device owner and the remote participants, and (b) the CE server software running on the server machine 601.

In particular, the steps of the CE method are effected by instructions 631 (see FIG. 6B) in the software 1806, 633 that are carried out within the computer system 600. The software instructions 631 may be formed as one or more code modules, each for performing one or more particular tasks. The software may also be divided into two separate parts, in which a first part and the corresponding code modules performs the CE methods and a second part and the corresponding code modules manage a user interface between the first part and the user.

The software may be stored in a computer readable medium, including the storage devices described below, for example. The software is loaded into the computer system 600 from the computer readable medium, and then executed by the computer system 600. A computer readable medium having such software or computer program recorded on the computer readable medium is a computer program product. The use of the computer program product in the computer system 600 preferably effects an advantageous CE apparatus.

The software 633, 1806 is typically stored in the HDD 610 or the memory 606 of the server and in a memory (not shown) of the communication devices. The software is loaded into the computer system 600 from a computer readable medium, and executed by the computer system 600. Thus, for example, the software 633 may be stored on an optically readable disk storage medium (e.g., CD-ROM) 625 that is read by the optical disk drive 612. A computer readable medium having such software or computer program recorded on it is a computer program product. The use of the computer program product in the computer system 600 preferably effects an advantageous CE apparatus.

In some instances, the CE application programs 633, 1806 may be supplied to the user encoded on one or more CD-ROMs 625 and read via the corresponding drive 612 and equivalent in the communication devices, or alternatively may be read by the user from the networks 620 or 622. Still further, the software can also be loaded into the computer system 600 from other computer readable media. Computer readable storage media refers to any non-transitory tangible storage medium that provides recorded instructions and/or data to the computer system 600 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 601. Examples of transitory or non-tangible computer readable transmission media that may also participate in the provision of software, application programs, instructions and/or data to the computer module 601 include radio or infra-red transmission channels as well as a network connection to another computer or networked device, and the Internet or Intranets including e-mail transmissions and information recorded on Websites and the like.

The second part of the application programs 633, 1806 and the corresponding code modules mentioned above may be executed to implement one or more graphical user interfaces (GUIs) to be rendered or otherwise represented upon the display 614 and the display of the communication devices 1805, 1808 for example. Through manipulation of typically the keyboard 602 and the mouse 603 at the server, and relevant user interfaces provided on the communication devices 1805, 1808, a user of the computer system 600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 617 and user voice commands input via the microphone 680.

FIG. 6B is a detailed schematic block diagram of the processor 605 and a "memory" 634. The memory 634 represents a logical aggregation of all the memory modules (including the HDD 609 and semiconductor memory 606) that can be accessed by the computer module 601 and the in FIG. 6A. A similar description applies to the operation of the communication devices 1805, 1808.

When the computer module 601 is initially powered up, a power-on self-test (POST) program 650 executes. The POST program 650 is typically stored in a ROM 649 of the semiconductor memory 606 of FIG. 6A. A hardware device such as the ROM 649 storing software is sometimes referred to as firmware. The POST program 650 examines hardware within the computer module 601 to ensure proper functioning and typically checks the processor 605, the memory 634 (609, 606), and a basic input-output systems software (BIOS) module 651, also typically stored in the ROM 649, for correct operation. Once the POST program 650 has run successfully, the BIOS 651 activates the hard disk drive 610 of FIG. 6A. Activation of the hard disk drive 610 causes a bootstrap loader program 652 that is resident on the hard disk drive 610 to execute via the processor 605. This loads an operating system 653 into the RAM memory 606, upon which the operating system 653 commences operation. The operating system 653 is a system level application, executable by the processor 605, to fulfill various high level functions, including processor management, memory management, device management, storage management, software application interface, and generic user interface.

The operating system 653 manages the memory 634 (609, 606) to ensure that each process or application running on the computer module 601 has sufficient memory in which to execute without colliding with memory allocated to another process. Furthermore, the different types of memory available in the system 600 of FIG. 6A must be used properly so that each process can run effectively. Accordingly, the aggregated memory 634 is not intended to illustrate how particular segments of memory are allocated (unless otherwise stated), but rather to provide a general view of the memory accessible by the computer system 600 and how such is used.

As shown in FIG. 6B, the processor 605 includes a number of functional modules including a control unit 639, an arithmetic logic unit (ALU) 640, and a local or internal memory 648, sometimes called a cache memory. The cache memory 648 typically includes a number of storage registers 644-646 in a register section. One or more internal busses 641 functionally interconnect these functional modules. The processor 605 typically also has one or more interfaces 642 for communicating with external devices via the system bus 604, using a connection 618. The memory 634 is coupled to the bus 604 using a connection 619.

The application program 633 includes a sequence of instructions 631 that may include conditional branch and loop instructions. The program 633 may also include data 632 which is used in execution of the program 633. The instructions 631 and the data 632 are stored in memory locations 628, 629, 630 and 635, 636, 637, respectively. Depending upon the relative size of the instructions 631 and the memory locations 628-630, a particular instruction may be stored in a single memory location as depicted by the instruction shown in the memory location 630. Alternately, an instruction may be segmented into a number of parts each of which is stored in a separate memory location, as depicted by the instruction segments shown in the memory locations 628 and 629.

In general, the processor 605 is given a set of instructions which are executed therein. The processor 1105 waits for a subsequent input, to which the processor 605 reacts to by executing another set of instructions. Each input may be provided from one or more of a number of sources, including data generated by one or more of the input devices 602, 603, data received from an external source across one of the networks 620, 602, data retrieved from one of the storage devices 606, 609 or data retrieved from a storage medium 625 inserted into the corresponding reader 612, all depicted in FIG. 6A. The execution of a set of the instructions may in some cases result in output of data. Execution may also involve storing data or variables to the memory 634.

The disclosed CE arrangements use input variables 654, which are stored in the memory 634 in corresponding memory locations 655, 656, 657. The CE arrangements produce output variables 661, which are stored in the memory 634 in corresponding memory locations 662, 663, 664. Intermediate variables 658 may be stored in memory locations 659, 660, 666 and 667.

Referring to the processor 605 of FIG. 6B, the registers 644, 645, 646, the arithmetic logic unit (ALU) 640, and the control unit 639 work together to perform sequences of micro-operations needed to perform "fetch, decode, and execute" cycles for every instruction in the instruction set making up the program 633. Each fetch, decode, and execute cycle comprises:

a fetch operation, which fetches or reads an instruction 631 from a memory location 628, 629, 630;

a decode operation in which the control unit 639 determines which instruction has been fetched; and an execute operation in which the control unit 639 and/or the ALU 640 execute the instruction.

Thereafter, a further fetch, decode, and execute cycle for the next instruction may be executed. Similarly, a store cycle may be performed by which the control unit 639 stores or writes a value to a memory location 632.

Each step or sub-process in the processes of FIGS. 1-5 is associated with one or more segments of the program 633 and is performed by the register section 644, 645, 647, the ALU 640, and the control unit 639 in the processor 605 working together to perform the fetch, decode, and execute cycles for every instruction in the instruction set for the noted segments of the program 633.

FIG. 1 is a flow chart of an example of a process 100 depicting how a person purchases and registers the exercise device, thereby becoming the owner of the exercise device and being able to effect the disclosed CE arrangements. The process 100 commences at the start step 101, after which in a following step 102 the person purchases the exercise device, and then registers the exercise device in a step 103, as described hereinafter in more detail with respect to FIG. 2, after which the process 100 ends with a stop step 104.

Figure 2:
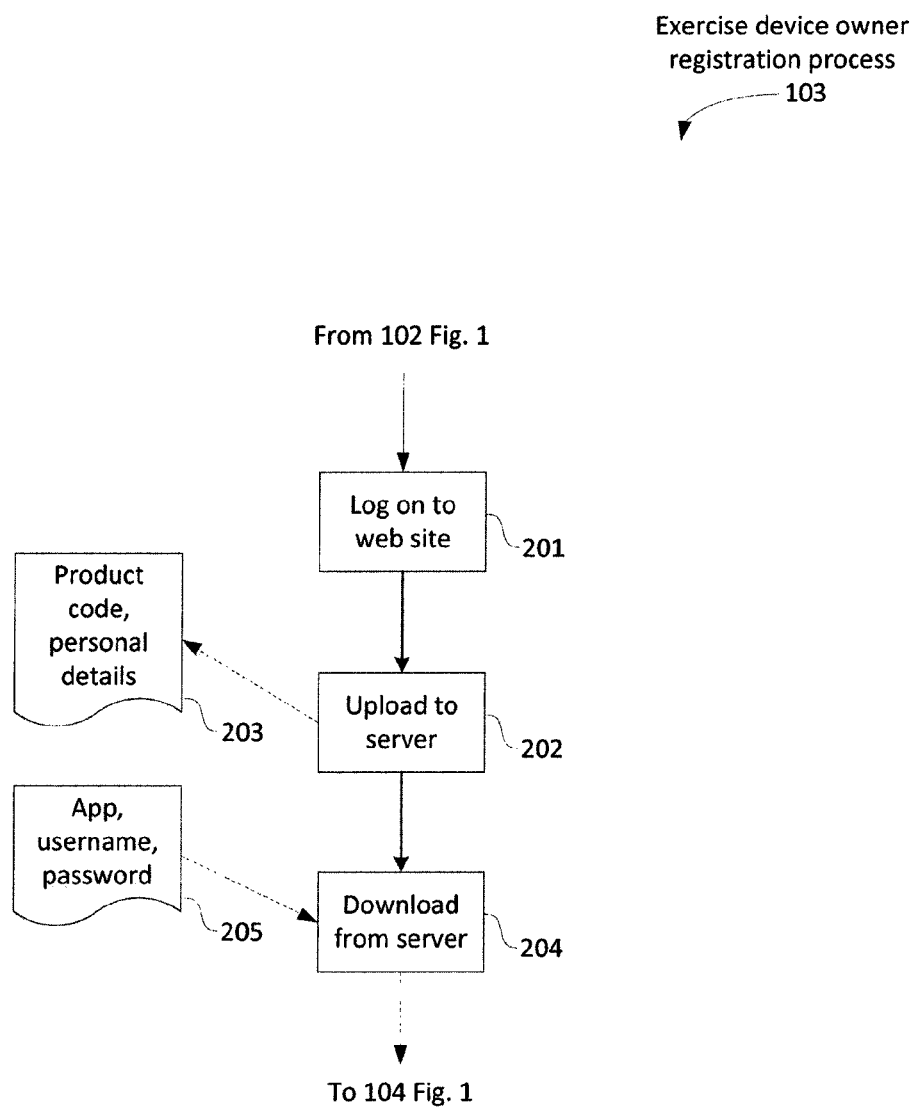
FIG. 2 is a flow chart showing an example of the registration step from FIG. 1 in more detail.

FIG. 2 is a flow chart showing an example of the registration step 103 from FIG. 1 in more detail. In a step 201, the owner of the exercise device logs on to the CE website (which is hosted on the CE server 601) using his communication device 1805, after which in a step 202, the owner of the exercise device uploads to the CE server the product code of the exercise device he has just purchased, together with his personal details such as his name, address, telephone number and email address. Thereafter, in a step 204, the owner of the exercise device downloads from the CE server 601 to his communications device 1805 the CE application as well as a user name and password. The aforementioned user name and password can be used by the owner of the exercise device when setting up exercise sessions according to the CE arrangement.

Figure 3:
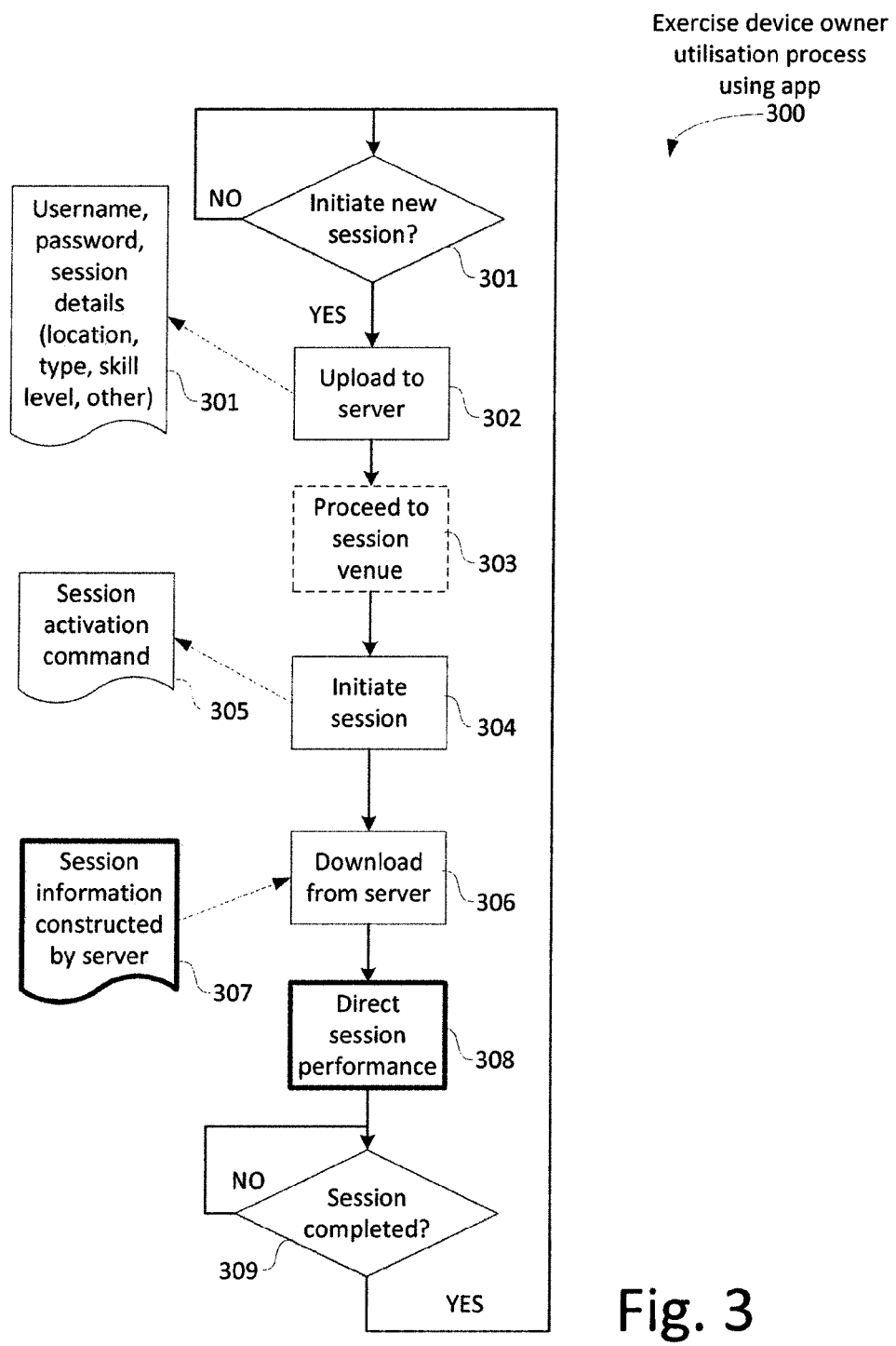
FIG. 3 is a flow chart of an example of process showing (i) how the owner of the exercise device electronically publishes details of a proposed exercise session, (ii) how remote participants apply for participation in the published session, and (iii) how the session is directed by the disclosed CE arrangement.

FIG. 3 is a flow chart of an example of a process 300 showing (i) how the owner of the exercise device publishes details of a proposed exercise session, (ii) how remote participants apply for participation in the published session, and (iii) how the session is directed by the disclosed CE arrangement. The process 300 commences with a step 301 in which the CE application that has been downloaded to the owner's communication device in the step 204 in FIG. 2 determines if the owner wishes to initiate a new exercise session. The owner would indicate his desire to do so by suitable interacting with the user interface generated by the CE application on his communication device 1805.

If the step 301 determines that no new session is presently desired, then the process 300 follows a NO arrow back to the step 301. If, on the other hand, the step 301 determines, based upon the owner providing a suitable command to the CE application 1806 running on his communication device 1805, that the owner does wish to initiate a new session, the process 300 is directed to a step 302 in which the owner enters his user name, password and details of the proposed exercise session into his communication device 1805. Details of the session can include the location of the session, the type of session (eg heavy cardio-vascular etc.), the skill level (eg beginner, intermediate etc.) and other details. The owner communication device 1805 uploads this owner session information 301 to the server 601. As described hereinafter in more detail in regard to FIG. 5, the server 601 processes this owner session information 301 to produce participant session information 307. The CE server 601 also published details of the proposed session in a manner that is accessible to remote participants who might wish to select a session in which to participate. In one CE arrangement, remote participants can access the CE web site using a PC for instance, view the available sessions, and apply to join a session. In another CE arrangement, described hereinafter in more detail in regard to FIG. 4, the remote participant can download the CE application to a communication device such as a PC or a smartphone, and view/apply to join sessions using the installed CE application.

When the time for the exercise session arrives, the owner takes the exercise device to the session venue, as depicted by a following step 303. Thereafter, in a step 304, the owner initiates the exercise session by inputting the appropriate command to the CE application running on his communication device 1805, and the communication device 1805 uploads a corresponding session activation command 305 to the server. Thereafter, in a step 306, the owner communication device 1805 downloads the participant session information 307 constructed by the server 307.

The owner then, in one example, inserts the communication device 1805 into the relevant slot in the exercise device 1818, and the communication device 1805 directs the session performance by, in one example, allocating participants in the exercise session to the various exercise stations as the exercise session progresses using the electronic circuitry and audio speakers in the exercise device 1818.

In a following step 309, the CE application 1806 running on the owner communication device 1805 determines if the session is completed. If this is not the case, then the process 300 follows a NO arrow back to the step 309. If, on the other hand, the session is completed, then the process 300 follows a YES arrow back to the step 301.

Figure 4:
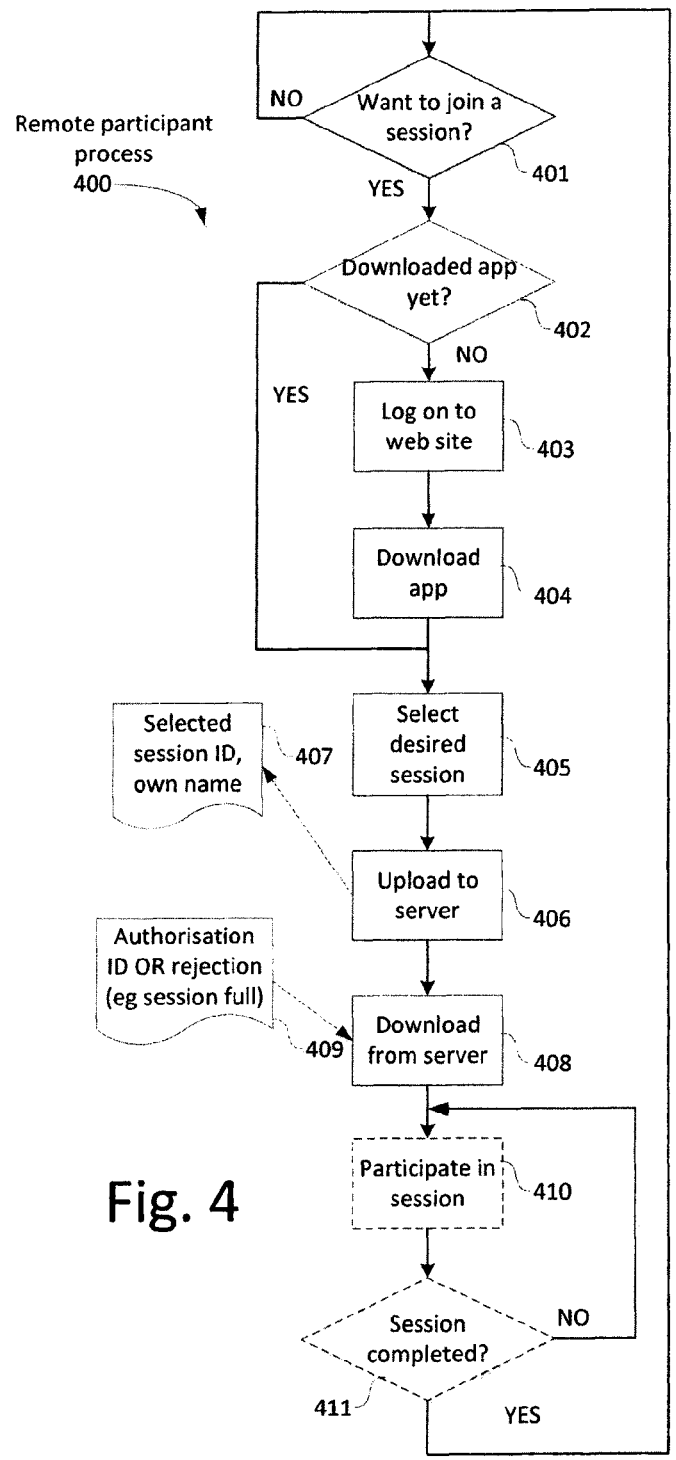
FIG. 4 is a flow chart of an example of a process used by a remote participant wishing to join a published exercise session.

FIG. 4 is a flow chart of an example of a process 400 used by a remote participant wishing to join a published exercise session. A first step 401 determines whether the remote participant is interested in joining an exercise session according to the CE arrangement. If this is not the case, then the process follows a NO arrow back to the step 401, indicating that the person in question has not decided to join such a session. If, on the other hand, the person is interested in joining a session, then the process 400 follows a YES arrow to a step 402. In the step 402, if the participant has not yet downloaded the CE application to her communication device then the process 400 follows a NO arrow to a step 403. In the step 403 the remote participant logs on to the CE website, and in a following step 404 downloads the CE application to her PC or her mobile communication device. The process 400 is then directed to a step 405.

Returning to the step 402, if the remote participant has already downloaded the CE application on to their communication device, then the process 400 follows a YES arrow to the step 405.

In the step 405, the downloaded CE application on the remote participant's communication device displays available published exercise sessions, preferably within a specified radial distance of the remote participant person in question. The remote participant person selects a desired session, using the CE application graphical user interface associated with her communication device and then in a following step 406, as directed by the CE application, the remote participant uploads to the CE server the ID of the selected session as well as the remote participant's name. Thereafter, in a step 408, the remote participant's communication device downloads, from the CE server, either an authorisation ID or a rejection 409. As described hereinafter in more detail in regard to FIG. 5, the CE server determines whether to authorise or reject a participants request based on a number of factors.

If the remote participant has received an authorisation ID then the process 400 is directed to a step 410 in which the remote participant, being an authorised remote participant goes to the exercise session venue and participates in the exercise session in question. This participation continues as long as the session continues as indicated by the loop around the steps 410 and 411. Once the session is completed, then the process 400 follows a YES arrow from the step 411 back to the step 401. The remote participant wishing to participate is then free to select another session to join.

Figure 5:
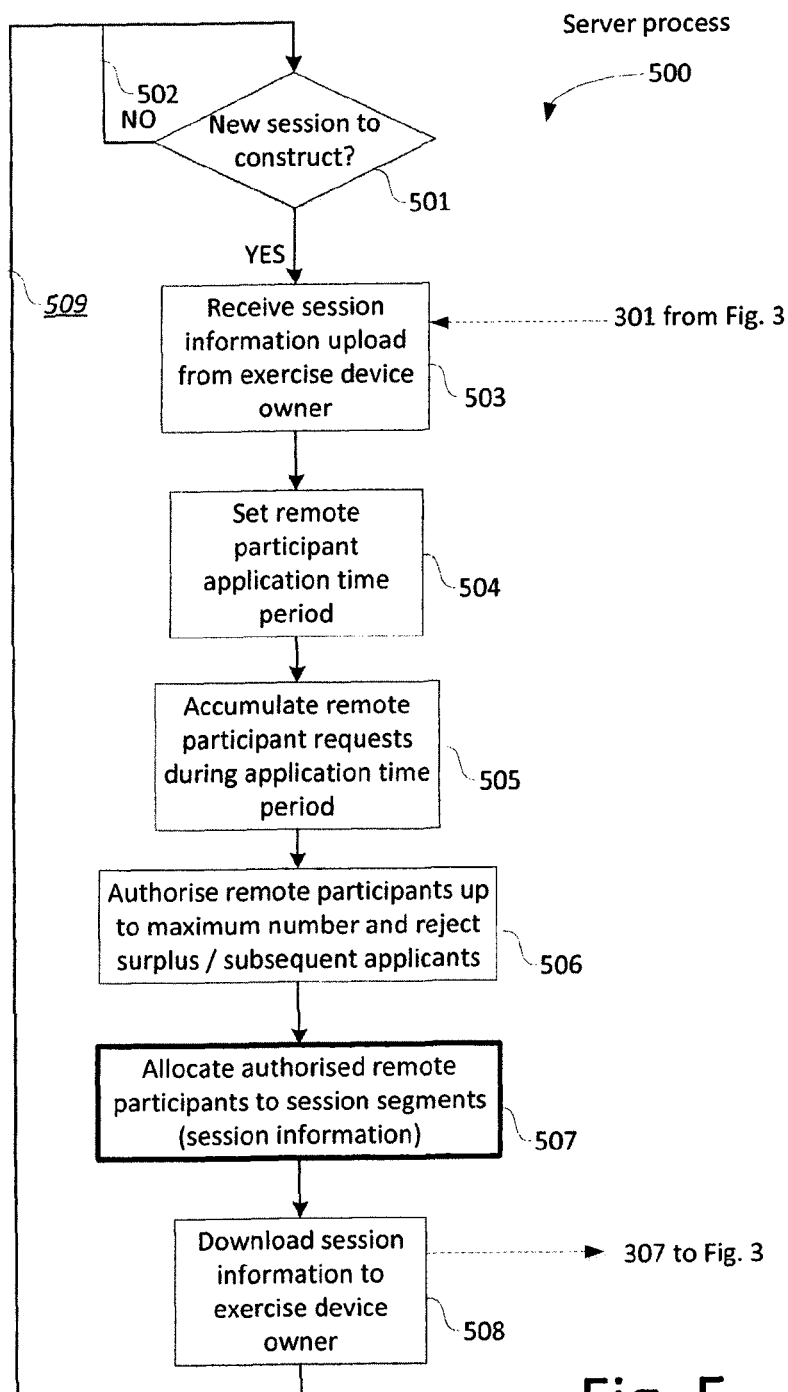
FIG. 5 is a flow chart of an example of a process used by the CE server to allocate participants to various exercise stations during an exercise session.

FIG. 5 is a flow chart of an example of a process 500 used by the CE server 601 to allocate participants to various exercise stations during an exercise session. In an initial step 501 the CE server determines if there is new participant session information 307 to construct. This will be determined based upon whether the CE server has received an upload of owner session information 301 from an exercise device owner from the step 302 in FIG. 3. If this is not the case, then the process 500 follows a NO arrow 502 back to the step 501. If, on the other hand, a new session is to be constructed, then the process 500 follows a YES arrow to a step 503. In the step 503 the CE server receives owner session information 301 uploaded from the step 302 in FIG. 3. Thereafter, in a step 504, the server sets a remote participant application time period. This time period is the time period during which remote participants interested in joining the exercise session in question may be accepted to the exercise session. Thus, for example, if the exercise device owner plans an exercise session in a month's time, the participant application time period might be set to one month less two days.

In a following step 505, the CE server accumulates remote participant requests, and continues to do so as long as the participant application time period set in the step 504 has not elapsed. In a following step 506 the server authorizes remote participants up to a maximum number, and rejects any surplus/subsequent remote participant applicants, by sending them a rejection 409 as depicted in the step 408 in FIG. 4. The maximum number of authorized remote participants determined by the step 506 can depend on a number of factors, including the number of exercise stations specified by the owner session information 301 provided in the step 302.

In a following step 507 the CE server allocates authorized remote participants to session segments (also referred to as exercise routines) dependent upon the number of authorized participants, and the owner session information 301 provided by the step 302.

The following table provides two examples of how the step 507 in FIG. 5 can allocate authorized participants to various session segments.

| Index No. | Exercise routine No. | Exercise station No. | Participant No. |
| --- | --- | --- | --- |
| 1 | a | 1 | 1 |
| 2 | a | 2 | 2 |
| 3 | a | 3 | 3 |
| 4 | a | 4 | 4 |
| 5 | a | 5 | 5 |
| 6 | a | 6 | 6 |
| 7 | a | 1 | 1 |
| 8 | a | 2 | 2 |
| 9 | a | 3 | 3 |
| 10 | b | 4 | 4 |
| 11 | b | 5 | 5 |
| 12 | b | 6 | 6 |
| 13 | a | 1 | 4 |
| 14 | a | 2 | 5 |
| 15 | a | 3 | 6 |
| 16 | b | 4 | 1 |
| 17 | b | 5 | 2 |
| 18 | b | 6 | 3 |

In a first example in the above table, depicted by index numbers 1-6, an exercise routine "a", such as star jumps, has been allocated to all six exercise stations that are available on the exercise device in question. Six participants, designated participant number 1 through participant number 6 are therefore allocated to corresponding exercise stations 1-6. Since all of the exercise stations are associated with the same exercise routine number "a", the CE arrangement does not move participants between exercise stations during the exercise session since there is no point in doing so because all of the stations are associated with the same exercise "a".

In a second example in the above table, depicted by index numbers 7-18, exercise routine "a", ie star jumps, is associated with exercise station numbers 1-3, while exercise routine number "b", eg lunges, is associated with exercise stations 4-6. Accordingly, in a first session segment depicted by index numbers 7-12 the CE arrangement allocates participant numbers 1-6 to corresponding exercise stations 1-6. This means that participant numbers 1-3 will be performing exercise routine number "a" and participant numbers 4-6 will be participating in exercise routine "b". In a subsequent exercise session segment depicted by index numbers 13-18 the CE arrangement reallocates the participants so that participant numbers 4-6 are allocated to exercise stations 1-3 respectively, while participant numbers 1-3 are allocated to exercise station numbers 4-6 respectively. In this manner, participants are rotated between the exercise routine number "a" and the exercise routine "b".

Clearly participants can be allocated and moved around the various exercise stations depending upon how exercise routines are allocated to those stations.

In a following step 508, the server downloads the participant session information to the mobile communication device of the exercise device owner, as depicted by the step 306 in FIG. 3. The process 500 then follows an arrow 509 back to the step 501.

Although the invention has been described with reference to specific examples, it will be appreciated by those skilled in the art that the invention may be embodied in many other forms.

The invention claimed is:

1. An exercise device having:
   a base;
   a wall extendable away from said base to a closure;
   said base, wall and closure defining a space therebetween configured to receive exercise equipment;
   a plurality of slots locatable about said wall, said slots configured to receive said exercise equipment;
   a plurality of displays each operatively associated with a respective one of said slots, said displays configured to display an exercise to be performed by a user, wherein said users positioned adjacent said device are provided information as to exercises to be performed at a particular location;
   wherein said device further includes a plurality of locators each operatively associated with a respective one of said displays, said locators configured to define the particular location defining an exercise station; and
   further wherein each said locator includes a rigid member and a flexible elongate portion extendable between said rigid member and said base.

2. The exercise device according to claim 1, wherein said locator is configured to be positioned at a distance from said displays.

3. The exercise device according to claim 1, wherein said locator is configured to be positioned on said device.

4. The exercise device according to claim 1, wherein each said rigid member is configured to be received within a corresponding slot within said base.

5. The exercise device according to claim 1, wherein said locator includes said elongate portion having a first end and a second end.

6. The exercise device according to claim 1, wherein said each said rigid member is configured to be received by said device.

7. The exercise device according to claim 1, wherein said locator includes a flexible member.

8. The exercise device according to claim 1, wherein said locator includes a close rigid member.

9. The exercise device according to claim 1, wherein said device includes said plurality of locators configured to form an exercise grid in use.

10. The exercise device according to claim 1, wherein said device includes a retraction mechanism configured to retract said flexible portion into said base.

11. The exercise device according to claim 1, wherein said device includes a mechanism configured to fix said rigid member in a particular location away from said base.

12. The exercise device according to claim 1, wherein each said display provides an exercise.

13. The exercise device according to claim 1, wherein each said display includes a card.

14. The exercise device according to claim 1, wherein each said card is to be located within said slot in use.

15. The exercise device according to claim 1, wherein each said card includes a unique identifier.

16. The exercise device according to claim 1, wherein said identifier is a number, letter or combination thereof.

17. The exercise device according to claim 1, wherein said base includes at least one wheel to assist with the mobility of said device.

18. The exercise device according to claim 1, wherein said device includes an insert securable to said base and configured to hold exercise equipment.

19. An exercise device having:
a base;
a wall extendable away from said base to a closure;
said base, wall and closure defining a space therebetween configured to receive exercise equipment;
a plurality of slots locatable about said wall, said slots configured to receive said exercise equipment;
a plurality of displays each operatively associated with a respective one of said slots, said displays configured to display an exercise to be performed by a user, wherein said users positioned adjacent said device are provided information as to exercises to be performed at a particular location;
wherein said wall and closure are a single member, said single member configured to be lifted away from said base to access said space.

20. The exercise device according to claim 1, wherein said wall includes at least one panel, said panel configured to be moved to allow access to said space.

21. The exercise device according to claim 1, wherein said closure is a lid.

22. The exercise device according to claim 1, wherein said device includes a mechanism to provide an audio signal.

23. The exercise device according to claim 1, wherein said device includes a slot to receive a speaker in use.

24. The exercise device according to claim 1, wherein said device includes a speaker.

25. The exercise device according to claim 1, wherein said device is powered.

26. The exercise device according to claim 1, wherein said device includes a mechanism to provide audio directions to said users.

27. The exercise device according to claim 1, wherein said device is removably connected to an electronic device.

* * * * *